United States Patent [19]
Rooney et al.

[11] Patent Number: 5,922,109
[45] Date of Patent: Jul. 13, 1999

[54] GAS DRYING PROCESS USING GLYCOL SOLUTION SOLUBILITY SUPPRESSANTS

[75] Inventors: Peter C. Rooney, Lake Jackson, Tex.; Felipe A. Donate, Midland, Mich.; Stephen A. Bedell, Lake Jackson, Tex.; Joseph R. Downey, Midland, Mich.

[73] Assignee: The Dow Chemical Company, Midland, Mich.

[21] Appl. No.: 08/816,012

[22] Filed: Mar. 11, 1997

[51] Int. Cl.$^6$ .................................................. B01D 53/28
[52] U.S. Cl. .............................................................. 95/231
[58] Field of Search .............................. 95/231, 190, 194, 95/177, 156, 161, 166; 423/226; 252/364; 568/621, 606; 585/422

[56] References Cited

U.S. PATENT DOCUMENTS

| | | | |
|---|---|---|---|
| 1,866,560 | 7/1932 | Gordon et al. | 95/231 |
| 2,225,959 | 12/1940 | Miller | 95/231 X |
| 2,603,311 | 7/1952 | Frazier et al. | 95/231 X |
| 2,988,171 | 6/1961 | Arnold et al. | 95/231 |
| 3,253,390 | 5/1966 | Connors | 95/231 X |
| 3,255,573 | 6/1966 | Cox, Jr. | 95/231 X |
| 3,737,392 | 6/1973 | Ameen et al. | 252/364 |
| 3,745,746 | 7/1973 | Psyras et al. | 95/231 X |
| 3,745,747 | 7/1973 | Psyras et al. | 95/231 X |
| 3,831,346 | 8/1974 | Sharp et al. | 95/190 |
| 3,855,337 | 12/1974 | Foral, Jr. et al. | 95/231 X |
| 4,005,997 | 2/1977 | Fowler et al. | 95/190 |
| 4,282,386 | 8/1981 | Donate et al. | 568/606 |
| 4,334,102 | 6/1982 | Decker et al. | 568/621 |
| 4,446,118 | 5/1984 | Nicksic | 423/226 |
| 4,479,811 | 10/1984 | Schlicht et al. | 95/231 X |
| 4,518,396 | 5/1985 | Rawson et al. | 95/231 X |
| 4,689,436 | 8/1987 | Minokani et al. | 585/422 |
| 4,784,673 | 11/1988 | Blytas et al. | 95/231 |
| 4,810,267 | 3/1989 | Landeck et al. | 95/177 |
| 4,979,965 | 12/1990 | Sannholm | 95/194 |
| 5,167,675 | 12/1992 | Rhodes . | |
| 5,346,537 | 9/1994 | Lowell | 95/161 |
| 5,453,114 | 9/1995 | Ebeling | 95/166 |
| 5,462,584 | 10/1995 | Gavlin et al. | 95/231 |

FOREIGN PATENT DOCUMENTS

| | | | |
|---|---|---|---|
| 1528548 | 12/1989 | U.S.S.R. | 95/231 |
| 595128 | 11/1947 | United Kingdom . | |
| 843503 | 8/1960 | United Kingdom | 95/231 |

*Primary Examiner*—Richard L. Chiesa

[57] ABSTRACT

A process is disclosed for removing aromatics, and volatile organic hydrocarbons from a gaseous fluid stream including passing the fluid stream in contact with a dehydrating composition comprising a glycol selected from triethylene glycol, ethylene glycol, diethylene glycol, or mixtures thereof and a hydrocarbon solubility depressant. The dehydrating composition may also contain a dissolved salt including at least one alkali metal carboxylate, an ammonium carboxylate, an alkali metal halide, an ammonium halide, or a mixtures thereof.

26 Claims, No Drawings

GAS DRYING PROCESS USING GLYCOL SOLUTION SOLUBILITY SUPPRESSANTS

BACKGROUND OF THE INVENTION

This invention relates to an improvement in the drying of gas streams. More particularly, it relates to reducing the absorption of aromatics and volatile organic hydrocarbons (VOC's) in a dehydrating solvent and correspondingly, reducing the emission of absorbed aromatics as VOC's when the solvent is regenerated.

Gases generally contain varying amounts of water vapor. The presence of the water vapor is undesirable as the water vapor can result in corrosion of pipes and cause corrosion of and stoppages in valves and fittings in gas transmission systems. The presence of water is also troublesome during combustion and while being transported during freezing weather, and during transport at temperatures above freezing, can result in the formation of gas hydrates.

A common method for removing moisture from gas streams, such as natural gas, is to use a glycol dehydration unit. In such a unit, the wet gas is contacted with a lean glycol in an absorbent step to remove the water. The glycol commonly used is triethylene glycol and to a lesser extent other glycols such as diethylene glycol or ethylene glycol. The rich glycol (glycol containing the water) is then passed to a reconcentration or regeneration process in which the absorbed water is removed, thereby enabling reuse of the glycol.

During the absorption step, the glycol absorbs some of the hydrocarbons in the gas. Glycol has a high affinity for aromatic compounds, such as benzene, toluene and xylene (BTEX), so the glycol removes the BTEX as well as other aliphatic volatile organic hydrocarbons. Upon heating the glycol to remove the water, the BTEX and VOC's are lost as emissions. The loss of the aromatic and aliphatic hydrocarbons from gases, such as natural gas, through emissions is a loss of valuable hydrocarbons which could be sold for their BTU value. In addition, depending upon the local regulations, such emissions may be viewed as a source of air pollution and would need to be treated and disposed of by costly means, such as combustion or condensation, to prevent these compounds from entering the air.

To reduce the absorption of aromatics in a glycol during gas dehydration, U.S. Pat. No. 5,462,584 discloses the use of either diphenylmethane or 1,1-diphenylethane in either a glycol alone or a glycol with potassium acetate or potassium formate which allows more of the aromatics to remain with the gas for subsequent combustion with the gas.

Notwithstanding the improved dehydration of natural gas with the use of glycols and diphenylmethane or 1,1-diphenylethane, there remains a need for an effective process for treating a gas stream.

SUMMARY OF THE INVENTION

The present invention is to a process for reducing the absorption of aromatics and VOC's into a dehydrating composition comprising passing a gaseous fluid in contact with a water dehydrating composition comprising a glycol selected from the group consisting of triethylene glycol, ethylene glycol, diethylene glycol and mixtures thereof and a hydrocarbon solubility depressant selected from the group consisting of compounds having greater than 45 percent by formula weight hydroxyl content, a tri to hexa-substituted benzene, substituted napthalenes, substituted tetrahydro-napthalene, substituted biphenyl, benzyl ethers, benzyl sulfides, phenyl sulfides, glycol methyl alkyl ethers and mixtures thereof.

In another aspect, the present invention is to a process for reducing the absorption of volatile aliphatic hydrocarbons into a dehydrating composition comprising passing a gaseous fluid in contact with a water dehydrating composition comprising a glycol selected from the group consisting of triethylene glycol, ethylene glycol, diethylene glycol and mixtures thereof and a hydrocarbon solubility depressant selected from the group consisting of compounds having greater than 45% by formula weight hydroxyl content, a tri to hexa-substituted benzene, substituted napthalenes, substituted tetrahydro-napthalene, substituted biphenyl, benzyl ethers, benzyl sulfides, phenyl sulfides, glycol methyl alkyl ethers and mixtures thereof.

In another embodiment, the present invention is to a method of reducing the abosorption of aromatic or volatile aliphatic hydrocarbons into a dehydrating composition comprising passing a gaseous fluid in contact with a glycol and hydrocarbon solubility depressant as described above, wherein the water dehydrating composition further contains a dissolved salt comprising at least one alkali metal carboxylate, an ammonium carboxylate, an alkali metal halide or an ammonium halide.

In yet another embodiment, the present invention is to a method of dehydrating a gaseous fluid comprising passing the gaseous fluid in contact with a glycol and hydrocarbon solubility depressant as described above. Alternatively the glycol and hydrocarbon solubility depressant may alternatively contain a dissolved salt comprising at least one alkali metal carboxylate, an ammonium carboxylate, an alkali metal halide or an ammonium halide.

DETAILED DESCRIPTION OF THE INVENTION

It has been found that in a process for dehydrating a gaseous fluid using a glycol, the addition of a hydrocarbon solubility depressant to the glycol is effective in reducing the amount of aromatic and aliphatic hydrocarbons dissolved in the glycol. For the present invention an aliphatic hydrocarbon to be removed from the gas stream is defined as a $C_5$ or greater aliphatic hydrocarbon.

The process of dehydrating a gaseous fluid using a glycol is well known in the art, such as is described by the processes in U.S. Pat. No. 2,988,171 and Kohl et al., "Gas Purification" $4^{th}$ Edition, 1985, Gulf Publishing Company. These known processes can be used with the dehydrating compositions of the present invention. Preferably, the gas is contacted with the dehydrating composition in a continuous counter-current flow process. When the gaseous fluid is natural gas, the process generally passes the gas into the bottom of an absorber unit where the gas is contacted counter-currently with a lean dehydrating composition to remove the water. The dry gas exits the top of the absorber unit and the rich dehydrating composition is removed from the bottom of the absorber unit and pumped to a series of heat exchanges or to a flash tank or larger units. After the flash tank, or directly from the smaller absorber units, the rich dehydrating composition passes through a series of heat exchangers and filters before going to a still and regenerator, where water is stripped from the dehydrating composition. It is in this later step where the water is stripped that aromatics, such as BTEX, and aliphatic VOC's will also be stripped and if not condensed or combusted, could be emitted. The hydrocarbon solubility depressants of the present invention, decrease the amount of hydrocarbons that are absorbed in the dehydrating composition, thus reducing the amount of BTEX and/or VOC's which would be lost in the regeneration process.

The dehydrating composition used in the present invention comprises a glycol and an hydrocarbon solubility depressant. The glycols usually employed are mono-, di- and triethylene glycol and monopropylene glycol. Tetra- and pentaethylene glycol and dipropylene glycol may be employed, however; the higher glycols have higher viscosities making them less suitable for the present application. Preferably the glycol is selected from triethylene glycol, ethylene glycol (monoethylene glycol), diethylene glycol or mixtures thereof. The more preferred glycol is triethylene glycol.

Hydrocarbon solubility depressants are compounds which decrease the solubility of aromatic and aliphatic volatile organic compounds in the glycol. Hydrocarbon solubility depressants for use in the present invention are selected from compounds having high hydroxyl content, tri- to hexa-substituted benzene, substituted napthalenes, tetrahydro-napthalene, substituted tetrahydro-napthalene, substituted biphenyl, benzyl ethers, benzyl sulfides, phenyl sulfides, glycol methyl alkyl ethers or mixtures thereof. The term substituted with reference to benzene, napthalene, tetrahydro-napthalene and biphenyl means a —$NO_2$, —OR or —R moiety wherein R at each occurrence is independently a $C_1$–$C_{12}$ alkyl, $C_6$–$C_{12}$ aryl, or $C_7$–$C_{16}$ alkylaryl, aryloxy or arylalkyl. When R is an alkyl, preferably the alkyl has 1 to 6 carbon atoms. More preferably, when R is an alkyl, the alkyl has 1 to 3 carbon atoms. When R is an aryl, preferably R has 6 to 9 carbon atoms. When R is an alkylaryl, aryloxy or arylalky, preferably the moieties have 7 to 12 carbon atoms, more preferably from 7 to 9 carbon atoms. The hydrocarbon solubility depressants may also be inertly substituted, that is, substituted with moieties that do not adversely affect the ability of depressants to prevent absorption of the aromatic and aliphatic volatile organic compounds in the glycol.

Substituted benzene for use in the present invention can be represented by the formula

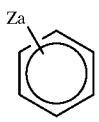

wherein Z at each occurrence is independently —$NO_2$, —OR, or —R, a is an integer of 3 to 6 and R is as previously defined. Preferred substituted benzene compounds are when Z is —OR. More preferred substituted benzene compounds are when Z is —OR, a is 3 and R is a $C_1$–$C_6$ alkyl. Most preferred substituted benzene compounds are when Z is —OR, a is 3 and R is a $C_1$–$C_3$ alkyl.

Substituted napthalene compounds can be represented by the formula

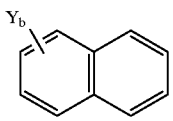

wherein Y at each occurrence is independently —$NO_2$, —OR, —R, hydrogen or halogen, b is an integer from 1 to 8 and R is as previously defined. Preferred substituted napthalene compounds are when Y is —OR. More preferred substituted napthalene compounds are when Y is -OR and b is an integer from 1 to 3. Most preferred substituted napthalene compounds are when Y is —OR, b is an integer from 1 to 3 and R is a $C_1$–$C_6$ alkyl. When each Y is hydrogen, the compound is napthalene.

Substituted tetrahydro-napthalene compounds can be represented by the formula

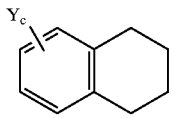

wherein Y is as previously defined and c is an integer from 1 to 12. Preferred substituted tetrahydro-napthalene compounds are when Y is —OR. More preferred substituted tetrahydro-napthalene compounds are when Y is —OR and c is an integer from 1 to 6. Even more preferred substituted tetrahydro-napthalene compounds are when Y is —OR, c is an integer from 1 to 3 and R is a $C_1$–$C_6$ alkyl. Most preferred substituted tetrahydro-napthalene compounds are when Y is —OR, c is an integer from 1 to 3 and R is a $C_1$–$C_3$ alkyl. When each Y is hydrogen the compound is tetrahydro-napthalene.

Substituted biphenyl compounds can be represented by the formula

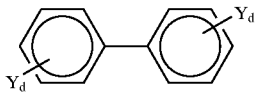

wherein Y is as previously defined and d is an integer from 1 to 5 with the proviso that not all Y's can be hydrogen (biphenyl). Preferred substituted biphenyl compounds are when Y is —OR. More preferred substituted biphenyl compounds are when Y is —OR and d is an integer from 1 to 3. Even more preferred substituted biphenyl compounds are when Y is —OR, d is an integer from 1 to 3 and R is a $C_1$–$C_6$ alkyl. Most preferred substituted biphenyl compounds are when Y is —OR, d is an integer from 1 to 3 and R is a $C_1$–$C_3$ alkyl.

The benzyl ethers or benzyl sulfides used in the present invention are generally of the formula

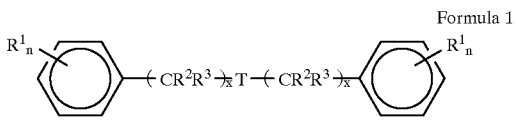

Formula 1 wherein T is oxygen or sulfur, each x is independently an integer from 1 to 6, each n is independently an integer from 1 to 5, and each $R^1$, $R^2$ and $R^3$ is independently a $C_1$–$C_6$ alkyl, $C_6$–$C_{12}$ aryl, $C_6$–$C_{16}$ aralkyl or aryloxy, $C_1$–$C_6$ alkoxy, —OH or halogen. Preferred compounds of Formula 1 are those wherein each x is 1. More preferred commands of Formula 1 are those wherein x is 1, and each of $R^1$, $R^2$ and $R^3$ are hydrogen.

Phenyl sulfides for use in the present invention are generally of the formula

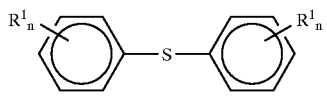

Formula 2 wherein $R^1$ and n are as previously defined. Preferred compounds of Formula 2 are those wherein each of $R^1$ are hydrogen. Preferred substituted phenyl sulfides are when $R^1$ is a $C_1$–$C_3$ alkoxy. More preferred substituted phenyl sulfides are when each $R^1$ is a $C_1$–$C_3$ alkoxy and n is an integer from 1 to 3. Even more preferred substituted phenyl sulfides are when n is 1 and each $R^1$ is a $C_1$–$C_3$ alkoxy.

Glycol alkyl ethers for use in the invention are generally of the formula

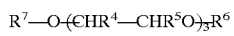

wherein each e is an integer from 1 to 6, $R^9$ and $R^5$ in each alkyleneoxy unit is independently hydrogen, methyl or ethyl, provided that at most only one of $R^4$ or $R^5$ is methyl or ethyl and $R^6$ and $R^7$ are each independently a $C_1$–$C_6$ alkyl or $C_5$–$C_6$ cycloalkyl with the proviso that only one of $R^6$ or $R^7$ is methyl or ethyl. Preferred glycol alkyl ethers are when $R^4$ and $R^5$ are each hydrogen or methyl. More preferred glycol alkyl ethers are when $R^4$ and $R^5$ are each hydrogen and one of $R^6$ or $R^7$ is methyl. Most preferred is a glycol alkyl ether where one of $R^4$ or $R^5$ is hydrogen and the other is methyl and one of $R^6$ or $R^7$ is methyl and other of $R^6$ or $R^7$ is butyl.

Compounds containing a high hydroxyl content are those compound where the hydroxyl component (—OH) is greater than 45 percent of the formula weight of the compound. Preferably the high hydroxyl content compounds have greater than 50 percent formula weight of hydroxyl content. More preferably the high hydroxyl content compounds have greater than 55 percent formula weight of hydroxyl content. Examples of such compounds are sorbitol and glycerine. For use in the present invention, the preferred high hydroxyl content compound is glycerin.

The additives used in the dehydrating composition of the present invention are readily obtainable commercially or can be made using standard synthetic processes known in the art. For example, substituted tetrahydro-napthalenes can be prepared by the procedures disclosed in T. Matsumato and Y. Forukawon, Ind. Eng. Chem. Prod. Res. Dev. 15:215(1976); U.S. Pat. No. 4,689,436; and European patent publication 0 164 038, which are incorporated herein by reference.

Mono- and polyalkylene glycol diethers can be prepared by the methods disclosed in U.S. Pat. No. 4,282,386: and Posner and Roger, J. Am. Chem. Soc. 99:8208 and 8214 (1977), the disclosures of which are incorporated herein by reference. Glycol alkyl ether can be prepared by the methods disclosed in U.S. Pat. No. 4,282,386, the disclosure of which is incorporated herein by references.

It will be apparent to those skilled in the art that, for each particular gas stream analysis, an optimum combination of hydrocarbon solubility depressant and glycol can be predetermined and prepared for introduction into a counter-current dehydration or staged system. In accordance with one preferred embodiment of the process of the invention, it is preferred that the amount of hydrocarbon depressant is about 0.01 to about 25 percent by weight of the total water dehydrating composition. In accordance with a particularly preferred embodiment of this invention, the preferred amount of HC depressant is about 2 to about 20 weight percent.

A typical counter-current system for dehydration of natural gas is taught by Kohl et al., "Gas Purification" $4^{th}$ Edition, 1985, Gulf Publishing Company. However, it will be apparent to those skilled in the art that such a counter-current system could be used for drying other gases as well. Due to losses which may occur, monitoring of the concentrations and corresponding continuous additions may be necessary.

In most counter-current gas dehydration systems, the dehydration solvent composition is introduced at the top of a vertical dehydration column and withdrawn at the bottom of the column. Correspondingly, the water-containing gas is introduced at the bottom of the vertical dehydration column and removed at the top, thus passing upwardly through the descending dehydration solvent composition. Alternately, for specific purposes, a gas can be dehydrated by passing it through one or more stages containing a dehydrating solvent composition, such as disclosed by U.S. Pat. No. 4,979,965. While the process of the present invention is applicable to any fluid gaseous stream where there is a need or desire to dehydrate the steam or to reduce the BTEX or amount of aliphatic hydrocarbon, the present invention is particularly advantageous in treating natural gas steams.

The temperature and pressure of the gas to be dehydrated can have an effect on the process of this invention. For example, for natural gas containing primarily methane, the temperature of the gas to be dehydrated will usually be within the range of about 85–105° F., having been reduced from higher temperatures when discharged from its underground source. Pressure during dehydration is usually increased to between about 500–1,000 psi. At this temperature, the gas will contain about 1.5 to 5 percent by weight of water.

The ability of the hydrocarbon solubility depressants to decrease the solubility of aromatic and aliphatic volatile organic compounds in the glycol can be enhanced by the addition of salts. Preferred salts are alkali metal carboxylates, ammonium carboxylates, alkali metal halides, ammonium halides, or a mixture thereof. Preferred alkali metals are potassium and sodium. Preferred carboxylates are acetate and formate. The preferred salts which can be added to the formulations of the present invention are potassium acetate, potassium formate, sodium acetate, sodium formate or mixtures thereof.

When a salt is added to the dehydrating formulations of the present invention, the formulation can contain up to about 40 percent by weight of the salt. Generally the salt concentration will be from about 15 to about 35 percent by weight of the dehydrating composition.

The invention will be further clarified by a consideration of the following examples, which are intended to be purely exemplary of the present invention. All percents are percent by weight unless otherwise indicated.

EXAMPLE 1

Evaluation of Various Glycol Ethers for Hydrocarbon Solubility Suppressants in TEG Solubility experiments of toluene in triethylene glycol (TEG) were performed using hydrophobic P-series glycol ethers and diethers (see Table 1). In these experiments, all compounds were evaluated at a concentration of 20 weight percent with the exception of propylene glycol methyl butyl ether, which was insoluble in TEG at 20 weight percent. TEG with added diphenylmethane was used as the control since this additive has been shown to be effective as a BTEX solubility suppressant in previous tests (See U.S. Pat. No. 5,462,584).

TABLE 1

Solubility of Toluene in TEG Blends.

| Trade name[a] | Chemical name | TEG + 20% additive | TEG + 20% additive + 10% toluene |
|---|---|---|---|
| Diphenylmethane | — | Soluble | 2 layers |
| Dowanol* PPh | Propylene glycol monophenyl ether | Soluble | Soluble |
| Dowanol* DPMA | Dipropylene glycol methyl ether acetate | Soluble | Soluble |
| Dowanol* TPnB | Tripropylene glycol mono n-butyl ether | Soluble | Soluble |
| Proglyde* DMM | Dipropylene glycol dimethyl ether | Soluble | Soluble |
| — | Propylene glycol n-hexyl ether | Soluble | Soluble |
| — | Propylene glycol methyl n-butyl ether | 20% Insoluble | — |
| — | Propylene glycol methyl n-butyl ether | 10% Soluble | 2 layers |

[a]Trademark of The Dow Chemical Company.

Solubility tests with the toluene were performed in 15 mL vials using 9 g of the TEG+additive solution and 1 g of toluene. The vial was shaken vigorously and then allowed to stand for 10 minutes. before rating the solubility. The TEG containing diphenylmethane separated into 2 layers. Only the propylene glycol methyl n-butyl ether worked as an additive in TEG to form 2 layers upon addition of toluene. No glycol mono ether or dimethyl ether worked as an additive. Gas chromatography of the diphenylmethane and propylene glycol methyl n-butyl ether blends showed that about a 11% reduction of toluene occurs (10% in the initial blend which is reduced to 8.9% in the bottom layer; see Table 2).

TABLE 2

Reduction of Toluene in TEG by Addition of Diphenylmethane or Propylene glycol methyl n-butyl ether.

| TEG Blend | Theoretical Composition of Homogeneous Blend (wt. %) | Composition by GC of the Bottom Layer (wt. %) After Shaking |
|---|---|---|
| TEG | 72.0 | 72.0 |
| Diphenylmethane | 18.0 | 14.7 |
| Toluene | 10.0 | 8.9 |
| TEG | 81.0 | 87.5 |

TABLE 2-continued

Reduction of Toluene in TEG by Addition of Diphenylmethane or Propylene glycol methyl n-butyl ether.

| TEG Blend | Theoretical Composition of Homogeneous Blend (wt. %) | Composition by GC of the Bottom Layer (wt. %) After Shaking |
|---|---|---|
| Propylene glycol methyl n-butyl ether | 9.0 | 7.1 |
| Toluene | 10.0 | 8.9 |

EXAMPLE 2

Use of Various Additives as Hydrocarbon Solubility Suppressants in TEG

Solubility test with various additives to TEG were done as described above. In Table 3, it is seen that the use of various trimethoxybenzenes results in decreased solubility of benzene in TEG when the additive and salt (20 weight percent potassium formate) is used in the TEG. In each case, to TEG containing 5 weight percent water, was added the additive, and optionally 20 weight percent potassium formate. Benzene was added to the cloud point. An 18.7–48 percent decrease in benzene solubility is observed in the TEG containing additives compared to TEG without additives.

TABLE 3

Effect of Trimethoxybenzenes on Benzene Solubility in TEG.

| | Additive Solubility | | Benzene Solubility in Additive solution | |
|---|---|---|---|---|
| Additive | TEG + 5% water (wt. %) | TEG-20 + 5% water (wt. %) | TEG + 5% water (wt. %) | TEG-20 + 5% water (wt. %) |
| None | — | — | 23.6 | 12.3 |
| 1,2,4-Trimethoxy benzene | 21.3[n.s.] | 21.5[n.s.] | 28 | 6.4 |
| 1,2,3-Trimethoxy benzene | 15.3[s] | 12.3[s] | 29.3 | 9.3 |
| 1,3,5-Trimethoxy benzene | 9.2[s] | 6.2[s] | 24.4 | 10.0 |

TEG-20 is TEG containing 20 wt. % potassium formate. s is saturated. n.s. is not saturated. Benzene solubilities determined using additive concentration shown in additive solubility column.

In Table 4, it is seen that the use of various methoxy substituted additives, ethers, sulfides, napthalenes and mono methyl mono alkyl propylene glycols result in decreased solubility of benzene in TEG when the additive is used alone, or in combination with salt (20 weight percent potassium formate) is used in the TEG. In each case, to TEG containing 5 weight percent water, was added the additive, and optionally 20 weight percent potassium formate. Benzene was added to the cloud point. A 10.2–98 percent decrease in benzene solubility is observed in the TEG containing additives compared to TEG without additives. Many of these additives are extremely effective without added salt as is required in U.S. Pat. No. 5,462,584.

TABLE 4

Effect of Various Additives on Benzene Solubility in TEG.

| Additive | Additive Solubility | | Benzene solubility in Additive solution | |
|---|---|---|---|---|
|  | TEG + 5% water (wt. %) | TEG-20 + 5% water (wt. %) | TEG + 5% water (wt. %) | TEG-20 + 5% water (wt. %) |
| None | — | — | 23.6 | 12.3 |
| 2-Methoxybiphenyl | 11.4[s] | 7.6[s] | 1.0 | 0.4 |
| 1-methoxy-napthalene | 23.8[n.s.] | — | 12.5 | — |
| Benzyl ether | 16.4 | 5.6 | 2.1 | 0.8 |
| Benzyl sulfide | 4.0[s] | — | 21.2 | — |
| Phenyl sulfide | 15.7[s] | 7.0[s] | 0.6 | 0.4 |
| 1,2,3,4-Tetrahydro-napthalene | 5.5[s] | 2.7[s] | 8.7 | 2.8 |
| Dowtherm* RP | 2.2[s] | 0.7[s] | 10.6 | 4.4 |
| Propyleneglycol methyl butyl ether | 6.3[s] | 1.8[s] | 6.0 | 3.3 |

TABLE 4-continued

Effect of Various Additives on Benzene Solubility in TEG.

| | Additive Solubility | | Benzene solubility in Additive solution | |
|---|---|---|---|---|
| Additive | TEG + 5% water (wt. %) | TEG-20 + 5% water (wt. %) | TEG + 5% water (wt. %) | TEG-20 + 5% water (wt. %) |
| Dipropyleneglycol methyl butyl ether | 4.8s | 1.3s | 16.6 | 9.6 |

*Trademark of The Dow Chemical Company. TEG-20 is TEG containing 20 wt. % potassium formate. s is saturated. n.s. is not saturated. Benzene solubilities determined using additive concentration shown in additive solubility column.

EXAMPLE 3

Use of High Hydroxyl Content Additives as Hydrocarbon Solubility Suppressants in TEG Toluene solubility was determined with 95 percent TEG (5 percent water) with and without high hydroxyl content additives as described in Example 1. The results are shown in Table 5. All percents are by weight. The results show that when the hydroxyl content of the additive exceeds about 45 percent of the formula weight, the toluene solubility can be reduced about 36 percent compared to 95 percent TEG.

TABLE 5

| Test Material | Additive OH Content | Toluene Solubility (%) |
|---|---|---|
| 95% TEG | — | 13.6 |
| TEG + 5% glycerine | 55.4 | 12.2 |
| TEG + 10% glycerine | 55.4 | 10.5 |
| TEG + 15% glycerine | 55.4 | 8.7 |
| TEG + 5% sorbitol | 56 | 12.5 |
| TEG + 10% sorbitol | 56 | 10.7 |
| TEG + 15% sorbitol | 56 | 8.9 |
| TEG + 5% propylene glycol | 44.7 | 13.9 |
| TEG + 10% propylene glycol | 44.7 | 13.6 |
| TEG + 15% propylene glycol | 44.7 | 14.4 |
| TEG + 5% trimethylolpropane | 38 | 14.4 |
| TEG + 10% trimethylolpropane | 38 | 14.3 |
| TEG + 15% trimethylolpropane | 38 | 13.9 |

EXAMPLE 4

Removal of Aromatics and Aliphatic Hydrocarbons from Gas Stream

For the control (Solution A), 6 mL of TEG containing 3 percent by weight water were placed in a ⅜ inch (0.95 cm) inside diameter tube. A natural gas stream containing aromatic and aliphatic impurities was maintained at 50° C. and passed through the solution at a rate of 1000 standard cubic meters per minute for 1 hour. At the end of the time, the solution was analyzed by gas chromatography for the aromatic and aliphatic impurities contained in the glycol solution.

Solution B is a solution comprised of 82 percent TEG, 3 percent water and 15 percent glycerin, all weight percents. Measurement of aromatic and aliphatic impurities contained in the solution was done by gas chromatography as described for Solution A. The results from the use of these solutions is shown in Table 6.

TABLE 6

| Solution | ppm Benzene | ppm Toluene | ppm Ethylbenzene | ppm xylenes | Other C5–C10 hydrocarbons |
|---|---|---|---|---|---|
| A | 562 | 935 | 462 | 1716 | 444 |
| B | 434 | 689 | 228 | 889 | 317 |

The results show that the addition of glycerin reduces the amount of aromatic and aliphatic hydrocarbons in the gas stream.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A process for reducing the absorption of aromatics, volatile aliphatic hydrocarbons, or a combination thereof into a dehydrating composition comprising passing a gaseous fluid in contact with a dehydration composition comprising a glycol selected from the group consisting of ethylene glycol, diethylene glycol, triethylene glycol and mixtures thereof, and a hydrocarbon solubility suppressant selected from the group consisting of a compound having greater than 45 percent by formula weight hydroxyl content, a tri to hexa-substituted benzenes, napthalene, substituted napthalenes, tetrahydro-napthalene, substituted tetrahydro-napthalene, substituted biphenyl, benzyl ethers, benzyl sulfides, phenyl sulfides, glycol methyl alkyl ethers and mixtures thereof.

2. The process of claim 1, wherein the dehydrating composition contains a dissolved salt comprising at least one alkali metal carboxylate, an ammonium carboxylate, an alkali metal halide or an ammonium halide.

3. The process of claim 2, wherein the dissolved salt is an alkali metal carboxylate selected from the group consisting of potassium acetate, potassium formate, sodium acetate, sodium formate and mixtures thereof.

4. A process in accordance with claim 1, wherein the hydrocarbon solubility suppressant is a glycol alkyl ether of the formula

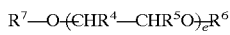

wherein each e is an integer from 1 to 6, $R^4$ and $R^5$ in each alkyleneoxy unit is independently hydrogen, methyl or ethyl, provided that at most only one of $R^4$ or $R^5$ is methyl or ethyl; and R6 and $R^7$ are each independently a $C_1$–$C_6$ alkyl or $C_5$–$C_6$ cycloalkyl with the proviso that only one of $R^6$ or $R^7$ is methyl or ethyl.

5. The process of claim 4 wherein $R^4$ and $R^5$ are hydrogen or methyl and one of $R^6$ or $R^7$ is methyl.

6. The process of claim 5, wherein the glycol ether is propylene glycol methyl butyl ether or dipropylene glycol methyl butyl ether.

7. The process of claim 1, wherein the hydrocarbon solubility suppressant is a benzyl ether or benzyl sulfide of the formula:

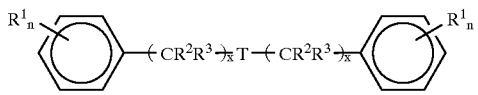

wherein T is oxygen or sulfur, each x is independently an integer from 1 to 6, each n is independently an integer from 1 to 5, and each $R^1$, $R^2$ and $R^3$ is independently a $C_1$–$C_6$ alkyl, $C_6$–$C_{12}$ aryl, $C_6$–$C_{16}$ aralkyl or aryloxy, $C_1$–$C_6$ alkoxy, —OH or halogen.

8. The process of claim 7, wherein each x is 1.

9. The process of claim 8 wherein each $R^2$ and $R^3$ is hydrogen.

10. The process of claim 1 wherein the solubility suppressant is benzyl ether or phenyl sulfide.

11. The process of claim 1, wherein the hydrocarbon solubility suppressant is a phenyl sulfide of the formula:

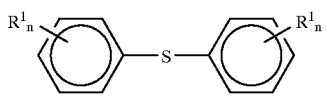

wherein $R^1$ at each occurrence is independently a $C_1$–$C_6$ alkyl, $C_6$–$C_{12}$ aryl, $C_6$–$C_{16}$ aralkyl or aryloxy, $C_1$–$C_6$ alkoxy, —OH or halogen and each n is independently an integer from 1 to 5.

12. The process of claim 11 wherein each of $R^1$ is hydrogen.

13. The process of claim 1 wherein the hydrocarbon solubility suppressant is a tetrahydro-napthalene of the formula:

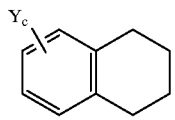

wherein Y at each occurrence is independently —$NO_2$, —OR, —R, hydrogen or halogen, c is an integer from 1 to 12 and R at each occurrence is independently a $C_1$–$C_{12}$ alkyl, $C_6$–$C_{12}$ aryl, or $C_7$–$C_{16}$ alkylaryl, aryloxy or arylalkyl.

14. The process of claim 13 wherein Y at each occurrence is —OR.

15. The process of claim 14 wherein c is an integer from 1 to 6.

16. The process of claim 15 wherein the tetrahydro-napthalene is 1,2,3,4-tetrahydronapthalene or [1,2,3,4-tetrahydro-5-(1-phenylethyl)-napthalene].

17. The process of claim 1, wherein the hydrocarbon solubility suppressant is a napthalene of the formula:

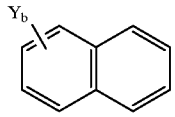

wherein Y at each occurrence is independently —$NO_2$, —OR, —R, hydrogen or halogen, b is an integer from 1 to 8 and R at each occurrence is independently a $C_1$–$C_{12}$ alkyl, $C_6$–$C_{12}$ aryl, or $C_7$–$C_{16}$ alkylaryl, aryloxy or arylalkyl.

18. The process of claim 17 wherein each Y is —OR.

19. The process of claim 18 wherein b is an integer of 1 to 3.

20. The process of claim 19 wherein the napthalene is 1-methoxynapthalene.

21. The process of claim 1, wherein the hydrocarbon solubility suppressant is a substituted biphenyl of the formula:

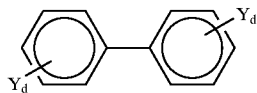

wherein Y at each occurrence is independently —$NO_2$, —OR, —R, hydrogen or halogen, d is an integer from 1 to 5 and R at each occurrence is independently a $C_1$–$C_{12}$ alkyl, $C_6$–$C_{12}$ aryl, or $C_7$–$C_{16}$ alkylaryl, aryloxy or arylalkyl with the proviso that not all Y's can be hydrogen.

22. The process of claim 21 wherein Y is —OR.

23. The process of claim 22 wherein d is an integer from 1 to 3.

24. The process of claim 23 wherein the substituted biphenyl is 2-methoxybiphenyl.

25. The process of claim 1 wherein the hydrocarbon solubility suppressant being a compound having greater than 45 percent by formula weight hydroxyl content is a compound with greater than 50 percent by formula weight hydroxyl content.

26. The process of claim 25 wherein the hydrocarbon solubility suppressant is glycerine or sorbitol.

* * * * *